(12) United States Patent
Khan et al.

(10) Patent No.: US 8,321,304 B2
(45) Date of Patent: Nov. 27, 2012

(54) STOCKED PRODUCT SENSING SYSTEM

(75) Inventors: Farrukh Khan, Chicago, IL (US); Yehea Ismail, Morton Grove, IL (US)

(73) Assignee: Ferveo Technology, Chicago, IL (US)

( * ) Notice: Subject to any disclaimer, the term of this patent is extended or adjusted under 35 U.S.C. 154(b) by 150 days.

(21) Appl. No.: 12/186,637

(22) Filed: Aug. 6, 2008

(65) Prior Publication Data

US 2010/0036754 A1 Feb. 11, 2010

(51) Int. Cl.
*G06Q 10/00* (2006.01)
(52) U.S. Cl. .......................................... 705/28; 211/186
(58) Field of Classification Search .................... 705/28; 211/189; 73/862.626
See application file for complete search history.

(56) References Cited

U.S. PATENT DOCUMENTS

| | | | |
|---|---|---|---|
| 6,834,251 B1 * | 12/2004 | Fletcher | 702/150 |
| 7,038,470 B1 * | 5/2006 | Johnson | 324/664 |
| 7,150,365 B2 * | 12/2006 | Hardy et al. | 211/189 |
| 7,233,241 B2 * | 6/2007 | Overhultz et al. | 340/539.2 |
| 2005/0161420 A1 * | 7/2005 | Hardy et al. | 211/189 |
| 2005/0279722 A1 * | 12/2005 | Ali | 211/59.3 |
| 2009/0114041 A1 * | 5/2009 | Harish et al. | 73/862.626 |

\* cited by examiner

*Primary Examiner* — Scott Zare
*Assistant Examiner* — Talia Crawley
(74) *Attorney, Agent, or Firm* — Pauley Peterson & Erickson

(57) ABSTRACT

A stocked product sensing system that can be used with a product display, displaying product items on one or more shelves thereof, to determine the level of product availability and/or configuration of product items on one or more shelves of the product display. According to one embodiment of this invention, the stocked product sensing system utilizes capacitive sensing at the shelf-level. According to another embodiment of this invention, the stocked product sensing system utilizes optical sensing at the shelf-level. The stocked product sensing system of this invention may utilize a store-level management system and/or a central management system and generate low stock alarms based on user-defined criteria in a software system.

21 Claims, 7 Drawing Sheets

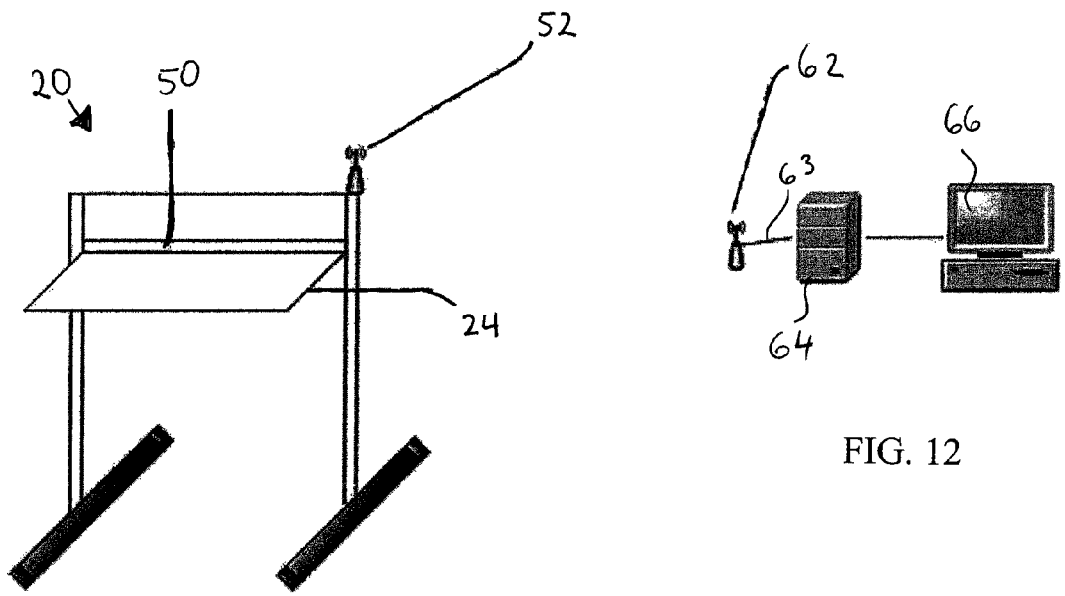
FIG. 11
FIG. 12
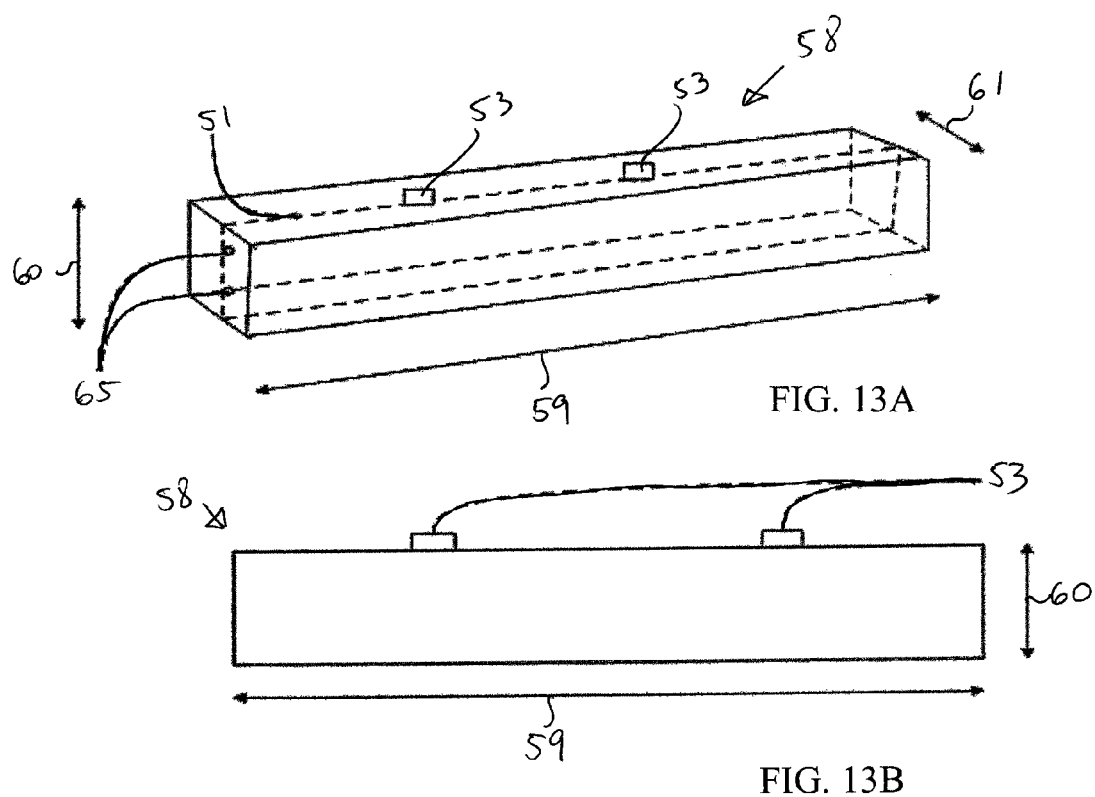
FIG. 13A
FIG. 13B

STOCKED PRODUCT SENSING SYSTEM

BACKGROUND OF THE INVENTION

1. Field of the Invention

This invention relates to a stocked product sensing system. More specifically, this invention relates to a stocked product sensing system for determining the level of product availability and/or identification of product items on a product display.

2. Discussion of Related Art

Sales facilities, such as, for example, retail grocery stores, stock products available for sale to customers on product displays. Product displays typically include one or more shelves, mounted to cooperative support members, for supporting products placed thereon. Product items are typically arranged such that one or more types of product items are displayed on each shelf. Customers identify the product item or items they want to purchase and remove the desired item or items from the shelf. Out-of-stock items result in lost sales and thus lost revenues and/or frustrated customers. As such, sales facilities must monitor the level of product availability on product displays to prevent and/or reduce out-of-stock items.

Despite various efforts to prevent or reduce out-of-stock conditions, the world-wide grocery industry currently suffers from about 8% of out-of-stock situations.

Previous efforts to check for out-of-stock items have been based on one or more of the following initiatives: a) manual checks performed by store clerks, which is an expensive and inefficient process that results in inaccurate and unreliable data; b) using RFID technologies, which are currently expensive to implement, specifically because they require expensive tags to be placed on individual items; c) modeling potential demand in stores through statistical algorithms, which, however, has only less than 75% accuracy; and d) using statistical models based on sales data to determine out-of-stock conditions, which also suffer from inaccurate measures and/or false out-of-stock alarms.

There is a need or a desire for a stocked product sensing system allowing for more accurate determination of the level of product availability on a product display and/or identification and/or configuration of product items on the product display and capable of producing low stock alerts in real time.

SUMMARY OF THE INVENTION

The sensing system of the present invention addresses one or more of the above-described inefficiencies of previous efforts in preventing or reducing out-of-stock conditions.

Without being bound by any particular theory, it is believed that the sensing system of the present invention may possess one or more of the below-identified advantages.

The stocked product sensing system of this invention does not require anything to be done at the product item level. All components are installed at the shelf-level.

The stocked product sensing system of this invention keeps track of products and/or product items displayed on shelves to prevent significant losses from out-of-stock conditions which are a major concern for the retail industry.

According to certain embodiments of this invention, the stocked product sensing system of this invention updates and transmits the level of product availability on each shelf in real-time and/or at certain time intervals. Thus, the stocked product sensing system of this invention minimizes the loss of sales by providing shelf count data in real-time, which can be used to alert store staff, truck routing supervisors and/or the main supply chain ordering system, resulting in a more efficient replenishment process and the reduction of losses incurred due to out-of-stock conditions.

The stocked product sensing system of this invention is an efficient and cost effective solution employing the use of the shelf itself as part of the detection system, in conjunction with the properties, such as, for example, electromagnetic properties, of items placed on the shelf.

In one embodiment of this invention, the unique sensor technology includes the shelves themselves and/or conducting plates associated with the shelves to determine the availability and/or configuration of product on the shelf.

In another embodiment of this invention, the unique sensor technology is placed on the shelf and uses solar cells to determine the availability of product on the shelf in terms of a percentage of fullness of the shelf and/or actual number of items.

The stocked product sensing system of this invention is easy to install and maintain and does not require any changes to the manufacturing process of the items being monitored. Instead, the system works at the shelf-level, requiring basic installation at the shelf itself.

The stocked product sensing system of this invention can detect complete and partial out-of-stock conditions, and is a very accurate depiction of the status of the shelf that will not generate false alarms.

The stocked product sensing system of this invention adjusts automatically for different types of items, such as, for example, items with liquid such as juice versus metal items such as soda cans.

The stocked product sensing system of this invention allows central management and data collection. It generates alerts based on user defined criteria in a software system.

The stocked product sensing system of this invention allows for data storage for historical analysis and alert generation in real-time based on user-defined thresholds. For example, if product A is out of stock in more than three stores in a given geographic area, such as a state, e.g., Illinois, the system may alert the local manager. If product B is out of stock in more than twenty-five stores, the system may alert the national account manager via phone and/or email.

The stocked product sensing system of this invention provides both central and distributed management of the out-of-stock conditions. Specifically, the system allows store-level exception-based alerts as well as headquarter-level alerts.

The stocked product sensing system of this invention can be designed by product for one manufacturer across all retail stores, as well as for several shelves of one retail chain and across all stores in the retail chain.

BRIEF DESCRIPTION OF THE DRAWINGS

These and other advantages of the present invention will be apparent to those skilled in the art from the following detailed description taken in conjunction with the following drawings in which like numerals represent like elements.

FIG. 11 is a perspective view of a shelf of a product display including the stocked product sensing system of this invention, showing the shelf in association with solar cells.

FIG. 12 is an illustration of a user interface according to one embodiment of the stocked product sensing system of this invention.

FIG. 13A is a perspective view of an acrylic case for enclosing one or more solar cells according to one embodiment of this invention.

FIG. 13B is a longitudinal side view of the acrylic case shown in FIG. 13A.

DESCRIPTION OF THE INVENTION

FIGS. 1-16 show various preferred embodiments of the stocked product sensing system according to the present invention.

Those skilled in the art and following the teachings herein provided will appreciate that while the description below of various embodiments of this invention refers to preferred configurations and uses, such configurations and uses are used for illustrative purposes only and may be modified as appropriate, depending on need.

Figure 1:
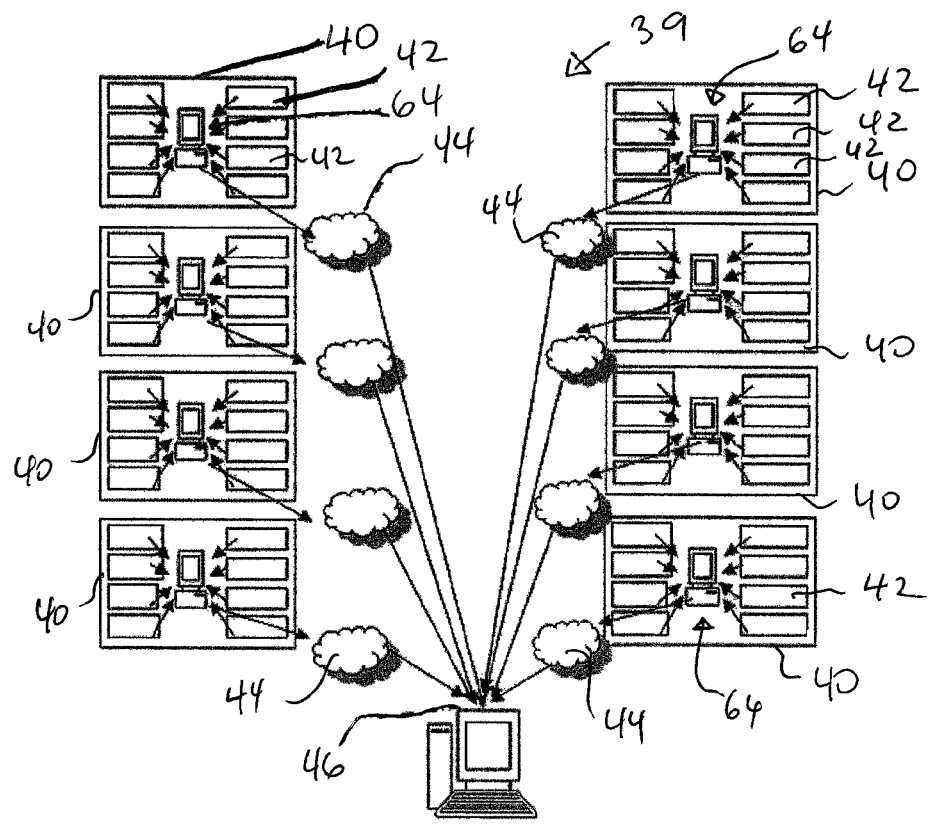
FIG. 1 is a diagrammatic representation illustrating the central management system of the stocked product sensing system according to one embodiment of this invention.

FIG. 1 shows a diagrammatic representation illustrating a stocked product sensing system according to one embodiment of the present invention, showing the central management system. FIGS. 2-10 show various preferred embodiments of the invention, utilizing capacitive sensing via conducting plates. FIGS. 11-16 show another preferred embodiment according to this invention, utilizing optical sensing via solar cell(s).

Capacitive System

Figure 2A:
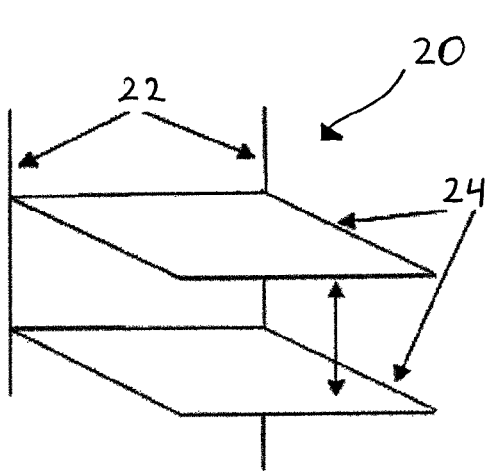
FIG. 2A is a partial perspective view of a product display.
Figure 2B:
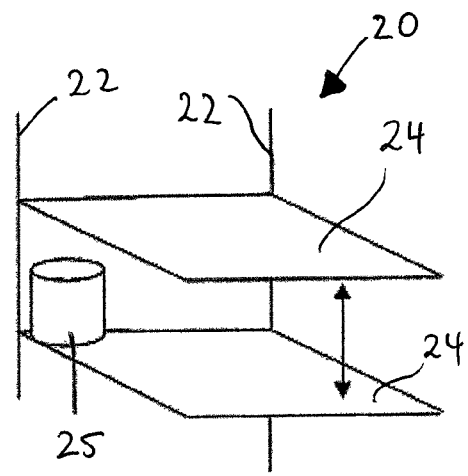
FIG. 2B is a partial perspective view of the product display shown in FIG. 2A, including a product item positioned on one shelf.

As shown in FIG. 2A, a product display 20, such as, for example, a product display that can be found in a grocery store or other retail stores, includes one or more support members 22, such as walls or beams, extending generally vertically with respect to a store's walking floor. Support members 22 typically support one or more generally horizontally oriented shelves 24 mounted thereto. Product items, such as product item 25 shown in FIG. 2B, are placed on, and supported by, one or more shelves 24.

The stocked product sensing system of this invention can be adapted to work with existing product displays by simply attaching the various components of the stocked product sensing system of this invention to an existing product display. Alternatively, the stocked product sensing system of this invention can be built into, incorporated and/or integrated with, a product display.

The stocked product sensing system according to one embodiment of this invention utilizes capacitive sensing to detect the amount of space filled with product items and, thus, the level of product availability on one or more shelves of a product display. The permittivity $\epsilon$ of a product item is different than the permittivity so of air, and different products have different permittivity $\epsilon$ values. As more product items are added to, or removed from, the space between two shelves and/or conducting plates, the total capacitance of the space changes. The stocked product sensing system according to one embodiment of this invention measures such changes in capacitance to determine the level of product availability and/or the configuration of product items on a product display.

The capacitance between two conducting plates is calculated using the following formula:

$$C = \epsilon A/d$$

where: C=capacitance
$\epsilon$=permittivity
A=the area of the conducting plates, and
d=the distance between two conducting plates With reference to FIG. 3, the stocked product sensing system according to one embodiment of this invention utilizes a plurality of conducting plates, such as conducting plates 32 shown in FIG. 3. The conducting plates 32 are electrically conducting plates that form a parallel plate capacitor. The conducting plates 32 are connectable to a power source (not shown), such as, for example, a battery, for charging the capacitor and, thus, creating an electric field between the conducting plates 32.

The conducting plates may be metallic and/or may be made of other electrically conducting material.

In certain embodiments of this invention, the existing metallic shelves 24 of the product display 20 may be used and/or function as one or more of the conducting plates 32 of this invention. Thus, as used throughout this document, the terms "conducting plate", "conducting plates", "shelf" and "shelves" may be used interchangeably. In other embodiments of this invention, one or more of conducting plates 32 may be attached to or with respect to one or more shelves 24 of the product display 20. The conducting plate with respect to which capacitance is measured may be referred to as a sensor plate throughout this document. According to one preferred embodiment of the invention, shelves 24 may include an insulating layer and/or comprise an insulating material.

Figure 9:
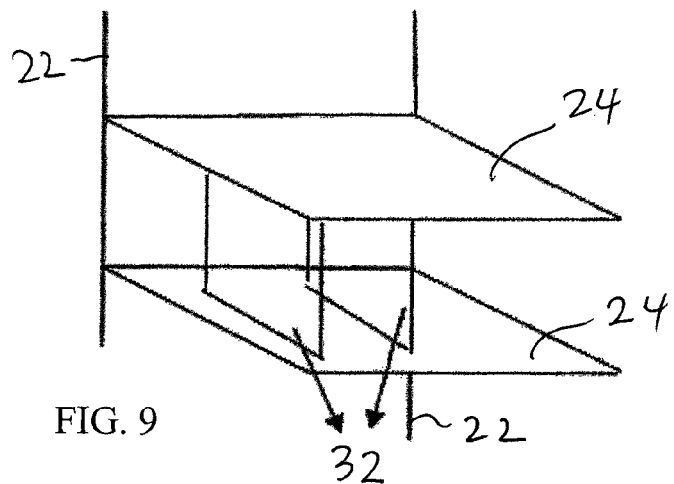
FIG. 9 is a partial perspective view of a product display including the stocked product sensing system of this invention, showing vertically oriented conducting plates positioned between two shelves of the product display.
Figure 10:
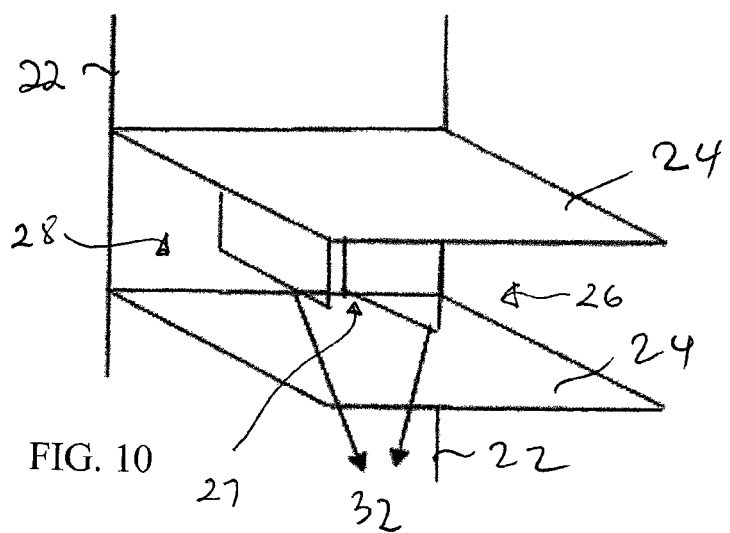
FIG. 10 is a partial perspective view of a product display including the stocked product sensing system of this invention, showing partial vertically oriented conducting plates attached with respect to a bottom of a top shelf of the product display.
Figure 14A:
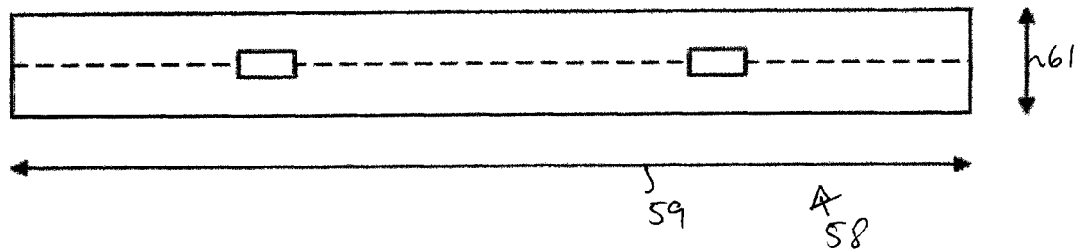
FIG. 14A is a top view of the acrylic case shown in FIG. 13A.
Figure 14B:
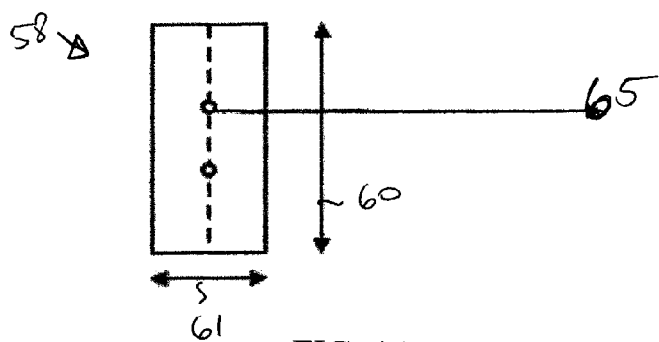
FIG. 14B is a transverse side view of the acrylic case shown in FIG. 13A.

The plurality of conducting plates 32 may be arranged in a horizontal direction or a vertical direction with respect to the product display 20. According to certain embodiments of this invention, conducting plates 32 are arranged in a horizontal direction in a spaced, generally vertical stack. One or more conducting plates 32 may be attached at the bottom and/or at the top of one or more shelves 24 and/or may form one or more horizontal shelves 24 of the product display 20, such as shown in FIGS. 3-7. According to other embodiments of this invention, conducting plates 32 are arranged in a vertical direction in a spaced, generally horizontal stack. One or more conducting plates 32 can be vertically oriented between two horizontal shelves 24, such as shown in FIGS. 9 and 10.

Figure 3:
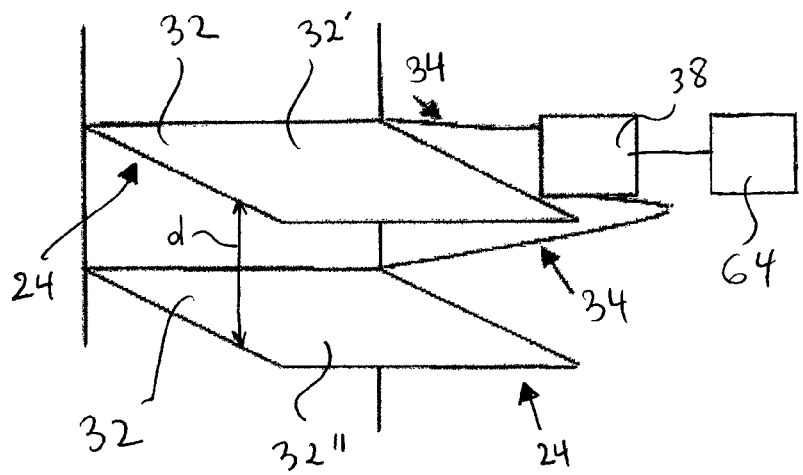
FIG. 3 is a partial perspective view of a product display including the stocked product sensing system of this invention, showing conducting plates connected to a measuring circuit.

With reference to FIG. 3, the plurality of conducting plates 32 may include at least a first conducting plate 32' having a first plate area and a second conducting plate 32" having a second plate area. Preferably, but not necessarily, the first plate area may generally be the same as the second plate area. The first conducting plate 32' and the second conducting plate 32" are generally parallel with respect to each other and spaced from each other a distance d. The conducting plates 32 of this invention are arranged in a generally parallel and spaced relationship with respect to each other such as to form a parallel plate capacitor and/or a parallel multi-plate capacitor.

Figure 8A:
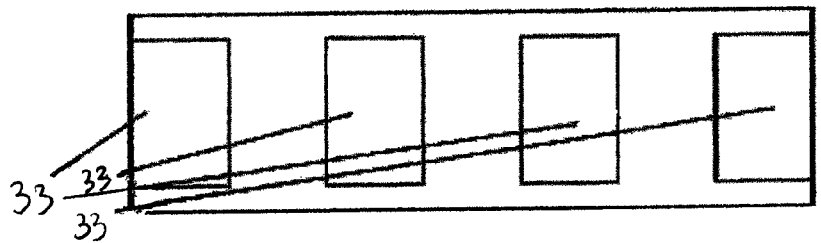
FIG. 8A is a bottom view of a shelf of a product display, showing conducting sub-plates attached with respect to the bottom of the shelf.
Figure 8B:
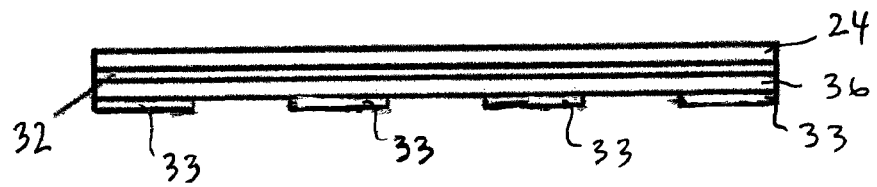
FIG. 8B is a side view of the shelf shown in FIG. 8A.

In certain embodiments of this invention, such as shown in FIGS. 8A and 8B, the stocked product sensing system further includes a plurality of conducting sub-plates 33 positioned in a spaced relationship along a shelf 24 of the product display 20. Each of the plurality of conducting sub-plates 33 may be individually selectable as a sensor plate for measuring capacitance with respect thereto. Such arrangement allows for the detection of space filled with product items in only certain sections of the shelf. For example, if different products are positioned in different sections of the shelf, one or more conducting sub-plates can be selected to determine the level of product availability of a single product or select products positioned on the shelf.

Figure 7:
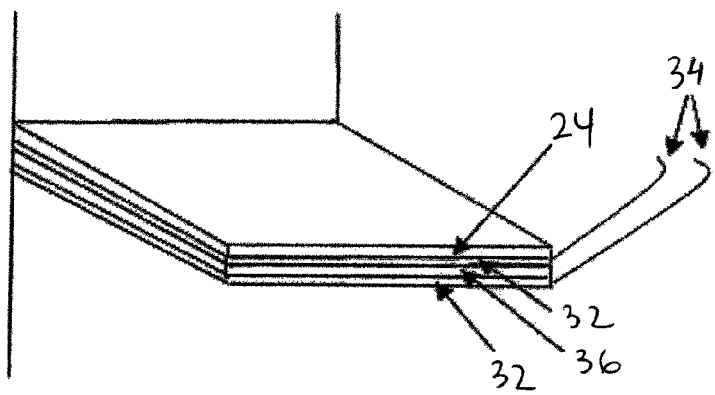
FIG. 7 is a partial perspective view of a product display including the stocked product sensing system of this invention, showing two conducting plates, sandwiching an insulation layer, attached to a bottom of a shelf.

With reference to FIGS. 7, 8A and 8B, adjacent conducting plates 32 and/or conducting sub-plates 33 may be separated by an insulation layer 36 positioned therebetween. The insulation layer 36 may be made of any insulating and/or non-conducting material known to those skilled in the art.

Product items are positioned on the product display with respect to one or more conducting plates 32 and/or conducting sub-plates 33. In certain embodiments of this invention, where the metallic shelves of a product display function as conducting plates, product items are positioned directly on the conducting plates.

The stocked product sensing system further includes means for communicating one or more electrical signals to one or more conducting plates of the plurality of conducting plates. The term "electrical signal," as used throughout this document, is intended to cover one or more of the following: electric charge and/or electric current. According to certain embodiments of this invention, the electrical signal can be communicated to one or more conducting plates at varying frequencies and/or at one of a plurality of frequencies. In one embodiment of this invention, the means for communicating one or more electrical signals to one or more of the plurality of conducting plates include electrical wiring connected to one or more of the plurality of conducting plates and/or directly to the metallic shelves of a product display. Electrical wiring 34 is shown in FIG. 3.

The stocked product sensing system may further include means for grounding one or more conducting plates of the plurality of conducting plates. The means for grounding one or more conducting plates of the plurality of conducting plates may include electrical wiring, such as electrical wiring 34 shown in FIG. 3.

The stocked product sensing system further includes a measuring circuit, such as measuring circuit 38 shown in FIG. 3, in communication with one or more conducting plates 32 of the plurality of conducting plates. The measuring circuit measures the capacitance between two conducting plates and/or with respect to one or more of the conducting plates (sensor plates), such as the capacitance from the sensor plate to the ground and/or from the sensor plate to free space.

The measuring circuit may include voltage sensing means for detecting the voltage across the capacitor formed by the conducting plates and converting the voltage signal to another signal, such as, for example, a digital signal. The measuring circuit may include a voltage comparator and/or an analog-to-digital converter.

The measuring circuit may measure capacitance periodically or continuously.

The measuring circuit may include a power source, e.g., a battery, for supplying electrical signals to the conducting plates.

The stocked product sensing system further includes a processor, such as processor 64 shown in FIG. 3, in communication with the measuring circuit. The measuring circuit communicates capacitance data points to the processor. The processor receives the capacitance data points from the measuring circuit and analyzes the capacitance data points to determine the level of product availability on the product display and/or create an appropriate alert based on user-defined criteria in a software system. The processor 64 may be a store computer 64 and/or a central server 46, as show in FIG. 1.

The processor preferably includes a computer-readable media having instructions stored thereon. When loaded onto a computer, the instructions may cause the computer to identify product items positioned on the product display based on the capacitance information received from the measuring circuit and preprogrammed product properties, such as, for example, permittivity $\epsilon$ values of different products. Alternatively or additionally, when loaded onto a computer, the instructions may cause the computer to identify the amount, identity and/or configuration of product items displayed on the product display based on historical changes in capacitance and/or the capacitance information determined at varying frequencies.

The processor may also include a memory circuit, for storing the capacitance data points received from the measuring circuit. The stored capacitance data points may be accessible by the computer-readable media and/or the processor, for historical analysis of capacitance information, such as historical changes in capacitance over time, to determine the level of product availability, the identity of product items and/or the arrangement of product items on the product display.

The stocked product sensing system further includes a user interface. The user interface preferably provides a human-readable and customizable output of the capacitance information based on user-selected criteria. The user interface may include one or more store computers, for in-store analysis of the level of stocked products in the store. The user interface may include one or more central computers connected to the central server and/or the wide area network, as described below, for analyzing the level of stocked products in several stores in a geographic region.

The processor in connection with the user interface may generate low stock alerts based on user-identified criteria in the software system.

The present invention also contemplates a method of determining a level of product availability of a product displayed on a product display. The method includes the step of supplying a first electrical signal to a first conducting plate and a second electrical signal to a second conducting plate. In embodiments including a plurality of conducting plates, the method includes the step of supplying an electrical signal to at least one of the plurality of conducting plates. The method may further include the step of grounding at least one conducting plate of the plurality of conducting plates.

For example, in an embodiment including two conducting plates, the first conducting plate may be supplied with a first electrical signal and the second conducting plate may be supplied with a second electrical signal. In an embodiment including a plurality of conducting plates, one conducting plate of the plurality of conducting plates may be supplied with an electrical signal while the remaining plates of the plurality of plates may be grounded.

The method further includes the steps of measuring capacitance between two conducting plates and analyzing the capacitance measured to determine the level of product availability between the conducting plates. The capacitance may be measured continuously or intermittently.

Figure 4:
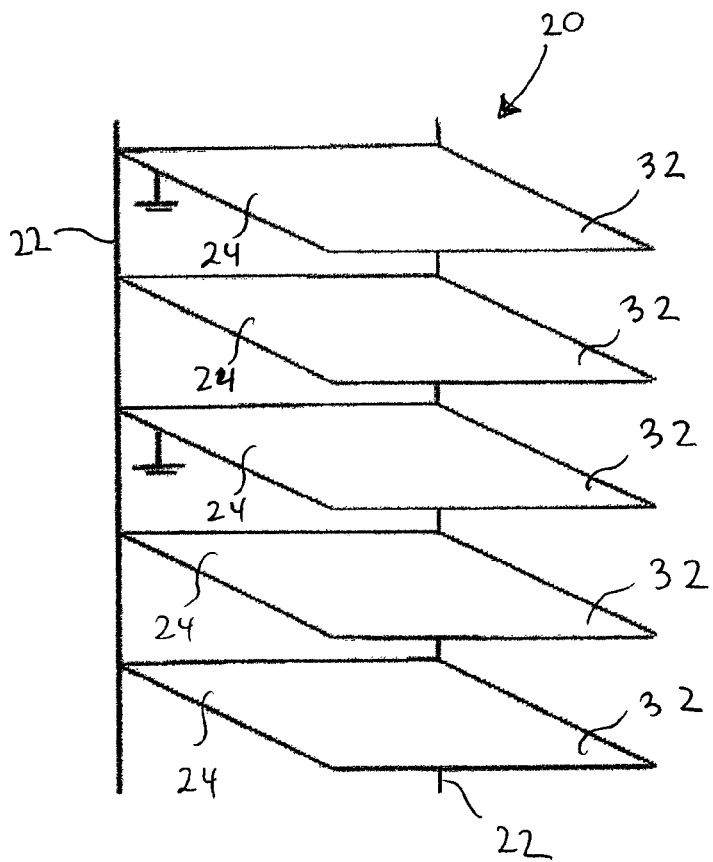
FIG. 4 is a partial perspective view of a product display including the stocked product sensing system of this invention, showing five shelves, each of which is a conducting plate according to the invention.
Figure 5:
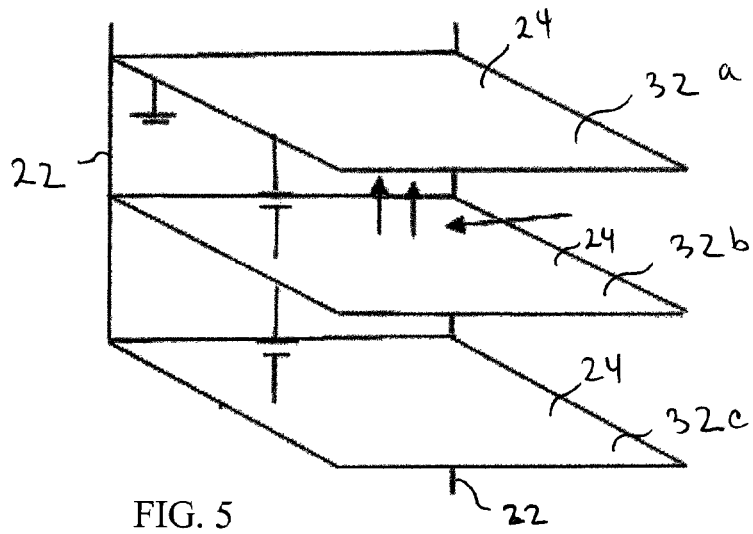
FIG. 5 is a partial perspective view of a product display including the stocked product sensing system of this invention, showing three shelves, each of which is a conducting plate according to the invention.

According to one embodiment of the method of this invention, the stocked product sensing system includes a plurality of conducting plates and the capacitance of each conducting plate (sensor plate) is determined by supplying an electrical signal to the sensor plate while keeping the remaining conducting plates grounded. When the sensor plate is positioned between two other conducting plates, the capacitance measured at the sensor plate comes from both conducting plates positioned on either side of the sensor plate, i.e., the capacitance of the space below and the space above the sensor plate is determined. In order to determine the capacitance, for example, only above the sensor plate, the capacitance at each conducting plate is determined, while keeping the remaining plates grounded, and the processor of the present invention solves a set of tri-diagonal linear equations. For illustrative purposes, a stocked product sensing system including five conducting plates, as shown in FIG. 4, will be described. For a stocked product sensing system including five conducting plates arranged in parallel as shown in FIG. 4, the capacitance at each conducting plate is measured while keeping the remaining conducting plates grounded. Once all five capacitance values are determined for all five conducting plates, the processor solves the following set of tri-diagonal linear equations:

$$\begin{bmatrix} 1 & 1 & 0 & 0 & 0 \\ 0 & 1 & 1 & 0 & 0 \\ 0 & 0 & 1 & 1 & 0 \\ 0 & 0 & 0 & 1 & 1 \\ 0 & 0 & 0 & 0 & 1 \end{bmatrix} \cdot \begin{bmatrix} c_1 \\ c_2 \\ c_3 \\ c_4 \\ c_5 \end{bmatrix} = \begin{bmatrix} c_{p1} \\ c_{p2} \\ c_{p3} \\ c_{p4} \\ c_{p5} \end{bmatrix}$$

where: $c_i$=the capacitance above the $i^{th}$ conducting plate
$c_{pi}$=the capacitance measured by supplying an electrical signal to the $i^{th}$ conducting plate while keeping the remaining conducting plates grounded Alternatively, to measure the capacitance between a conducting plate (sensor plate), positioned between two other conducting plates (e.g., a bottom conducting plate and a top conducting plate, as shown in FIG. 5), and only one of the two outer conducting plates, the sensor plate (i.e., the middle plate) and one of the outer conducting plates can be supplied with the same electrical signal (e.g. the same voltage) to eliminate the capacitance therebetween (Miller effect). The capacitance between the middle conducting plate and the remaining outer conducting plate, which may be grounded, is then determined. Without being bound by a specific theory, supplying the same electrical signal to two adjacent plates to create Miller effect and determining the capacitance with respect to a third capacitance plate increases the sensitivity of the stocked product sensor of the present invention as the total capacitance of the middle plate is decreased (due to Miller effect) and thus any observed percentage changes in capacitance will be more pronounced.

With reference to FIG. 5, a third conducting plate 32b is positioned between a first conducting plate 32c and a second conducting plate 32a.

To determine capacitance between the third conducting plate 32b and the second conducting plate 32a, the second conducting plate 32a may be grounded while a first electrical signal is supplied to the first conducting plate 32c and a third electrical signal is supplied to the third conducting plate 32b. The first electrical signal can be the same as the third electrical signal such that no electric field can exist between the third conducting plate 32b and the first conducting plate 32c due to Miller effect. The stocked product sensing system of the present invention determines the capacitance between the third conducting plate (sensor plate) 32b and the second conducting plate 32a.

Similarly, the capacitance between the first conducting plate 32c and the third conducting plate 32b can be determined by grounding the first conducting plate 32c and supplying a second electrical signal to the second conducting plate 32a, wherein the second electrical signal is the same as the third electrical signal supplied to the third conducting plate 32b.

Figure 6:
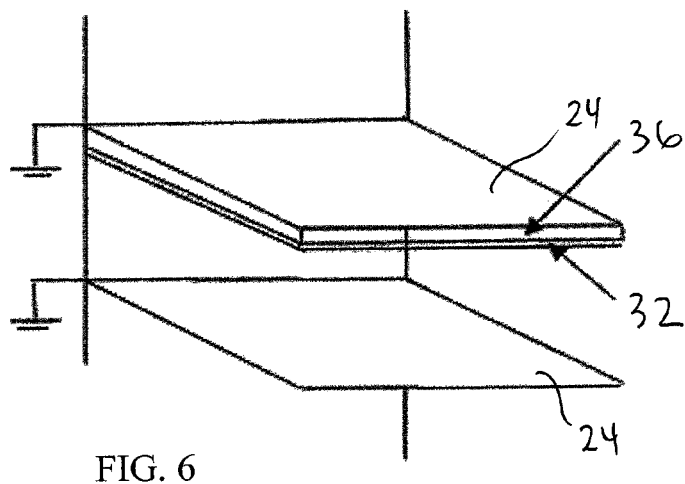
FIG. 6 is a partial perspective view of a product display including the stocked product sensing system of this invention, showing a conducting plate attached to a bottom of a shelf.

The sensing system of the present invention includes one or more conducting plates attached with respect to one or more shelves of a product display. For example, one or more conducting plates may be attached or positioned with respect to a bottom of a shelf to measure the capacitance below the shelf by supplying the one or more conducting plates with an electrical signal while keeping any remaining conducting plates and/or the shelves grounded. As shown in FIG. 6, a conducting plate 32 may be attached to a bottom of a shelf 24 and may be switched to measure the capacitance below the conducting plate 32, while keeping the shelves 24 grounded. Alternatively or additionally, one or more conducting plates may be attached or positioned with respect to a top of a shelf to measure the capacitance above the shelf by supplying the one or more conducting plates with an electrical signal while keeping any remaining conducting plates and/or the shelves grounded. An insulation layer may be positioned between the conducting plate and the shelf and/or two adjacent conducting plates. For example, in one embodiment of this invention, as shown in FIG. 7, two conducting plates 32 are assembled with an insulation layer 36 positioned between them and are attached with respect to a bottom of a shelf 24. In operation, the two conducting plates 32 may be supplied with the same electrical signal in order to determine the capacitance below the shelf 24.

As shown in FIGS. 8A and 8B, the stocked product sensing system of this invention may be adapted to sense individual sections between two shelves. The stocked product sensing system includes a main conducting plate 32, a plurality of conducting sub-plates 33 and an insulation layer 36 positioned between the main conducting plate 32 and the conducting sub-plates 33. Each of the plurality of conducting sub-plates 33 is generally parallel with the main conducting plate 32 and separated from the main conducting plate 32 by the insulation layer 36. A section of the shelf is sensed by switching the sensor sub-plate 33, i.e., the plate at which capacitance is measured, as well as the main conducting plate 32 and adjacent conducting sub-plates 33 in the same direction to create Miller effect. The conducting sub-plates 33 may be adjustable and/or repositionable with respect to the shelf 24. According to this preferred embodiment of the invention, shelf 24 comprises an insulating material. Alternatively, element 24 may comprise an insulating layer and a metallic shelf may be placed above the insulating layer." Each of the plurality of conducting sub-plates 33 may be individually selectable as the sensor plate for measuring capacitance with respect thereto.

According to another embodiment of this invention, as shown in FIG. 9, the stocked product sensing system of this invention includes a plurality of conducting plates 32 vertically oriented between two shelves 24. Each of the vertically oriented conducting plates 32 may be slideable between two shelves 24 in one of a plurality of locations. In one embodiment of this invention, the vertically oriented conducting plates 32 may be attachable to shelf partitions.

According to yet another embodiment of this invention, as shown in FIG. 10, the stocked product sensing system includes a plurality of partial vertically oriented conducting plates 32 positioned between two shelves 24. The partial vertically oriented conducting plates 32 may be slideable with respect to a bottom of a top shelf and may be repositionable with respect to the top shelf. Alternatively, the partial vertically oriented conducting plates 32 may be slideable with respect to a top of a bottom shelf and may be repositionable with respect to the bottom shelf. The stocked product sensing system according to this embodiment can be utilized to determine the location on the shelf (e.g., first zone 26, second zone 27 or third zone 28) from which a product item has been removed. The capacitance of each partial conducting plate 32 can be measured to infinity. The distance of the removed item with respect to each conducting plate will affect the change in capacitance detected by each conducting plate. For example, if an item was positioned closer to the first conducting plate than to the second conducting plate, e.g., in zone 26 or zone 28, the change in capacitance with respect to the first conducting plate will be much higher than the change in capacitance with respect to the second conducting plate, and vice versa. If an item was positioned roughly between the first conducting plate and the second conducting plate, e.g., in zone 27, the change in capacitance with respect to both conducting plates will be comparable.

In one embodiment, the method of the present invention includes the steps of measuring capacitance between a first conducting plate and a second conducting plate and determining the level of product availability on the product display based on the capacitance measured. In anther embodiment, the method of the present invention includes the steps of measuring capacitance of each conducting plate of the plurality of conducting plates, while keeping the remaining conducting plates and/or shelves grounded, and determining the level of product availability on the product display based on the capacitance measured. The method may further include the steps of monitoring changes in capacitance with respect to one or more conducting plates and determining the level of product availability on the product display based on the detected changes in capacitance. The method may still further include the steps of communicating capacitance data points to a memory circuit and storing capacitance data points in the memory circuit.

The present invention also contemplates a method of determining a level of product availability of a product displayed on a product display including a plurality of conducting plates associated therewith. The method includes the steps of supplying an electrical signal to one of the plurality of conducting plates, grounding the remaining conducting plates of the plurality of conducting plates, measuring capacitance of each conducting plate of the plurality of conducting plates while other conducting plates are grounded, and determining the level of product availability with respect to each conducting plate of the plurality of conducting plates by solving a set of tri-diagonal linear equations. The method further includes displaying capacitance information in a human-readable and customizable format and/or generating an alert based on a user-selected criterion. The method still further includes the steps of storing the capacitance information and/or capacitance data points in a memory circuit and determining item configuration on the product display based on historical capacitance information.

The method of this invention, where the electrical signal is supplied at a plurality of frequencies, further includes the step of identifying product items present on the product display based on capacitance information determined at each of the plurality of frequencies.

Optical System

Figure 15:
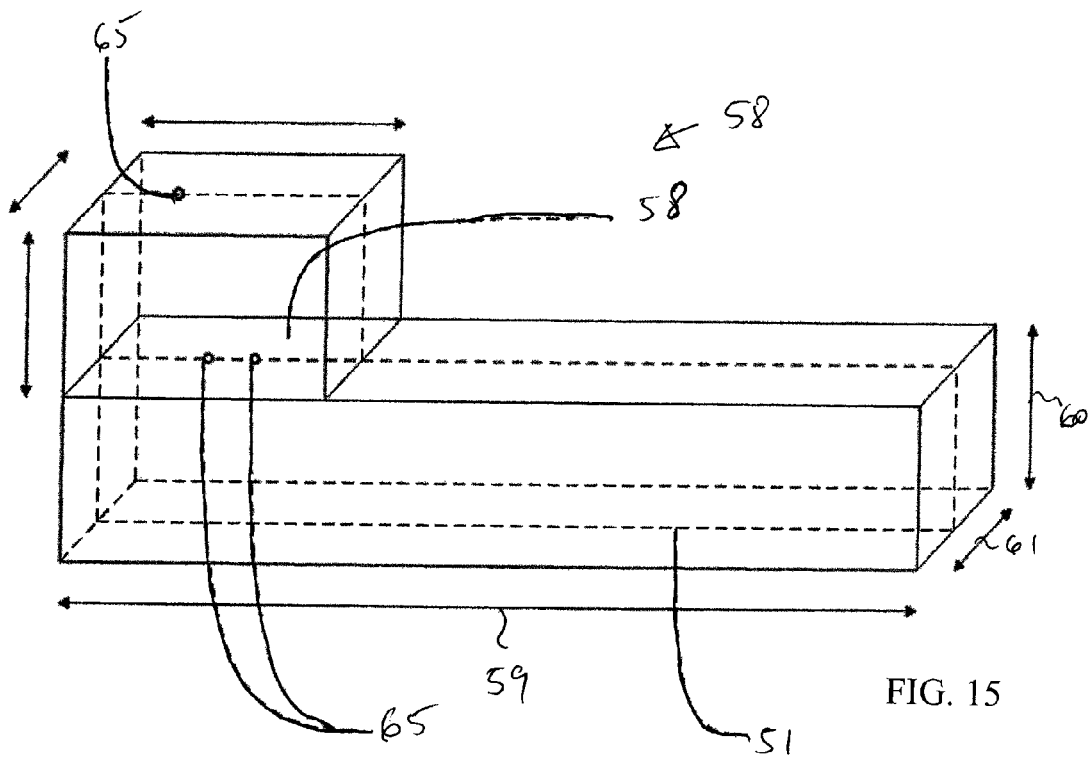
FIG. 15 is a perspective view of an acrylic case for enclosing one or more solar cells according to another embodiment of this invention, wherein the DLS Unit is enclosed in the acrylic case with the solar cells for a seamless construction.
Figure 16:
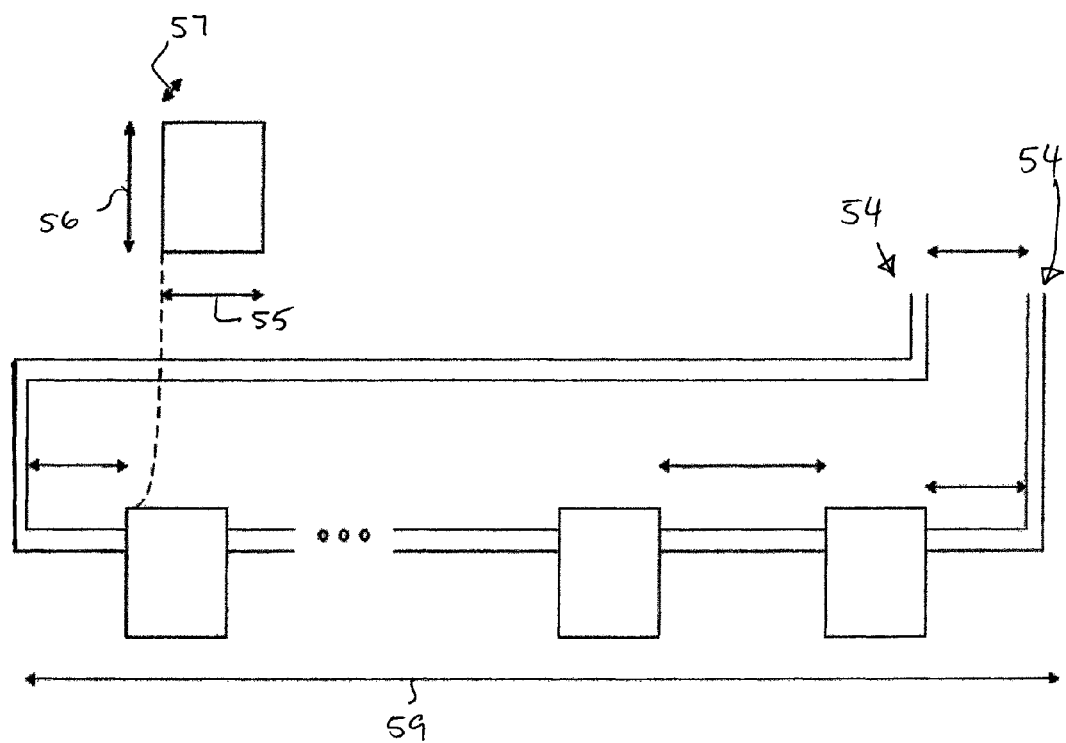
FIG. 16 is a diagrammatic representation of the solar cells connected in series, showing two end wires coming out from one side.

With reference to FIGS. 11-16 according to other embodiments of this invention, the stocked product sensing system includes one or more solar cells 50 connected with respect to a shelf 24 of a product display 20. The solar cells 50 can be mounted at the back of the shelf 24 and connected to a transceiver, e.g. a wireless transceiver, such as Data Logger Slave Unit (DLS Unit) 52 shown in FIG. 11. The solar cells 50 can be enclosed within a housing, such as an acrylic case 58, shown in FIGS. 13A-15. Multiple solar cells 50 can be connected in series, as shown in FIG. 16. As shown in FIG. 15, the DLS Unit 52 may be enclosed with the solar cell(s) 50 in the acrylic case 58 for a seamless construction. Data points collected at individual stores can be relayed to a central management system, as shown in FIG. 1.

According to one embodiment of this invention, the stocked product sensing system includes twelve solar cells 50. In one particular embodiment, each solar cell 50 has a first dimension 55 equal to 0.8 inch, a second dimension 56 equal to 0.8 inch and a third dimension 57 equal to 0.0625 inch, and the solar cells 50 are connected in series with wires 54, as shown in FIG. 16. The solar cells 50 may be enclosed in a clear acrylic case 58 having a length 59 equal to 48 inches, a height 60 equal to 1 inch, and a width 61 equal to 0.25 inch, as shown in FIGS. 13A-14B. The acrylic case 58 may include a seam line 51 with respect to which the acrylic case is openable and/or separable. The acrylic case 58 may further include one or more locking mechanisms 53, such as, for example, snaps or clasps, for keeping the acrylic case 58 in a closed position. Although specific dimensions are disclosed herein, it should be appreciated that the dimensions of the solar cells, the acrylic case and the dimensions of the wires can vary.

The acrylic case 58 containing the solar cells 50 can be mounted with respect to a shelf 24 of a product display 20. In the particular embodiment shown in FIG. 11, the shelf is 48 inches wide and 22 inches deep. It should be appreciated that the present invention can be used with shelves of other dimensions. One or more product items are placed on the shelf of the product display. The product items may include, without limitation, soda bottles or cans, cereal boxes, foodstuffs and/or liquids in glass containers, foodstuffs and/or liquids in cans, foodstuffs packaged in paperboard material and/or any other grocery or non-grocery product items.

According to one embodiment of this invention, the DLS Unit is a wireless transceiver with eight analog input channels including a unique ID for each input. The DLS Unit 52 is connectable to the solar cells 50. The Data Logger Master Unit (DLM Unit) 62 is a wireless transceiver including serial port communication for user interface. A cable 63, such as, for example RS-232 serial cable, can be used to connect the DLM Unit 62 to a data processor 64, such as, for example, a store computer, as shown in FIG. 12. The store computer can be a personal computer (PC) that stores and displays data received from the DLM Unit in real-time on display 66. The DLS Unit 52 relays data points to the DLM Unit 62 via wireless communication.

The stocked product sensing system further includes a computer-readable media. When loaded unto the store computer 64, the instructions included on the computer-readable media preferably cause the store computer 64 to display the collected data on the display 66. The data may be displayed in various forms and formats.

According to one embodiment of this invention, the acrylic case 58 is securely placed at the back of the shelf 24 of the product display 20. The solar cells 50 enclosed in the acrylic case 58 form a series connection with two wires 54 coming out from one end of the acrylic case 58. The wires 54 are twisted together and passed through one of the small holes 65 on the side of the acrylic case 58 and along its length to the top of the product display. This desirably makes the acrylic case 58 look seamless and neat on the shelf 24. At the top of the product display, the positive end is connected to an analog input channel of the DLS Unit 52. The negative end is grounded. The control station, as shown in FIG. 12, consists of a DLM Unit 62 with a serial port connected to a store computer for user interface features.

In operation, maximum and minimum reference voltage values are set up with the solar cells completely exposed and fully covered, respectively, under normal lighting conditions. All values falling in between the maximum and minimum reference voltage values are hence a percentage of the maximum voltage value. The DLM Unit and the DLS Unit have unique ID features such that the DLM Unit compares the address of the signal received from the DLS Unit with its own address. Thus, each shelf has a unique ID, which is identified by the software of the DLM Unit.

A full shelf 24 is entirely filled with product items. A full shelf will block almost entirely all the light that the solar cells need to operate. The DLS Unit will thus transmit a minimal or "0" voltage value along with the shelf ID. The DLM Unit receives the analog signal and communicates that value to the interface software. The software displays the value with a message that Shelf XX is full (where "XX" is the shelf ID), also indicating a numeric equivalent in terms of a percentage as being 100% full.

A shelf that is half full is filled with product items at about 50%. A half full shelf will roughly block out about 50% of the solar cells. The DLS Unit will transmit a value of about half of the maximum reference voltage. The DLM Unit receives and communicates the data to the store computer identifying Shelf XX (where "XX" is the shelf ID) as being half full and also indicating a numeric equivalent in terms of a percentage as being 50% full.

A shelf that is completely empty is free of product items and the solar cells are fully exposed. When the solar cells are fully exposed, the DLS Unit will transmit its maximum voltage value. The signal is received and communicated along with an alert identifying Shelf XX (where "XX" is the shelf ID) as being empty and also indicating a numeric equivalent in terms of a percentage as being 0% full.

Similarly, the DLS Unit will transmit three quarters of the maximum voltage value for a shelf, which is about 75% full, and one quarter of the maximum voltage value for a shelf, which is about 25% full. All other intermediate values are categorized as well and are configured by the software as accurately as possible.

The stocked product sensing system of this invention may include a central management system 39, as shown in FIG. 1. The various components of the central management system 39 will now be described in more detail.

A store 40 is a store or a supermarket which is a physical sales facility that customers visit to buy grocery items or other products. The central management system 39 of this invention can include any number of stores 40.

A shelf system 42 includes a shelf 24 of a product display 20. The shelf system 42 may further include one or more solar cells 50 associated with the shelf 24, a DLS Unit 52 in communication with the solar cells 50 and receiving data from the solar cells 50, and a DLM Unit 62 in wireless communication with the DLS Unit 52 and receiving data from the DLS Unit 52. According to another embodiment of this invention, the shelf system 42 may further include one or more conducting plates 32 associated with the shelf 24, means for communicating electrical signals to the conducting plates 32 and/or means for grounding one or more of the conducting plates, a measuring circuit in communication with the conducting plates 32, and means, e.g., the DLS Unit 52 and the DLM Unit 62 described above, for communicating capacitance data points from the measuring circuit to a processor for user interface features. The central management system of this invention can include any number of shelf systems 42.

A wide area network 44 is a wide area network within a retail chain to which the various stores 40 are connected.

A central server 46 includes a memory circuit to store the status information and/or data points from each shelf system 42 from each store 40. This information can be updated every thirty minutes or at other desired or required time intervals. The central server 46 also includes a computer-readable media including instructions for monitoring and/or analyzing all collected data points and generating alarms to the necessary parties based on preprogrammed alert conditions. The central server 46 also includes a computer-readable media including instructions for monitoring all historical data points and determining the trends in out-of-stock patterns and/or chronic out-of-stock behavior.

The stocked product sensing system can be used to determine the level of product availability on store shelves and generate alerts if the level is low. Alternatively or additionally, the stocked product sensing system of this invention can be used to determine accurate in-store status of the different product items; to determine appropriate shelf inventory that needs to be provided to the store; to determine specific replenishment schedules that would best meet the needs of the customers, e.g., replenishment at frequencies or time intervals that prevent out-of-stock conditions; and/or to determine product items which are at risk for future out-of-stock conditions.

The invention illustratively disclosed herein suitably may be practiced in the absence of any element, part, step, component, or ingredient, which is not specifically disclosed herein.

While in the foregoing specification this invention has been described in relation to certain preferred embodiments thereof, and many details have been set forth for purpose of illustration, it will be apparent to those skilled in the art that the laminate cutter is susceptible to additional embodiments and that certain of the details described herein can be varied considerably without departing from the basic principles of the invention.

What is claimed is:

1. A stocked product sensing system comprising:
    a plurality of conducting plates associated with a product display and including at least a first conducting plate having a first plate area as or on and extending over a product display shelf surface, and a second conducting plate having a second plate area, each conducting plate arranged in a generally parallel, spaced, and fixed relationship with respect to at least one other conducting plate;
    a product space between the first conducting plate and the second conducting plate, wherein one or more product items are positioned within the product space and on the first conducting plate;
    a measuring circuit in communication with at least one of the first or second conducting plates, wherein the measuring circuit measures a capacitance between the first conducting plate and the second conducting plate;
    a processor in communication with the measuring circuit for receiving the measured capacitance, wherein the processor compares the measured capacitance to a predetermined capacitance value to derive a level of product availability on the first conducting plate within the product space, wherein the measured capacitance differs from the predetermined capacitance value due to a change in permittivity between the first conducting plate and the second conducting plate; and
    a user interface providing an output of the capacitance.

2. The stocked product sensing system of claim 1, wherein at least one conducting plate of the plurality of conducting plates comprises a metallic shelf of the product display, wherein one or more product items are displayed on the metallic shelf.

3. The stocked product sensing system of claim 1, wherein the plurality of conducting plates are arranged in a horizontal direction in a spaced, generally vertical stack.

4. The stocked product sensing system of claim 1, wherein the plurality of conducting plates are arranged in a vertical direction in a spaced, generally horizontal stack.

5. The stocked product sensing system of claim 1, further comprising means for connecting at least one conducting plate of the plurality of conducting plates to an electrical ground.

6. The stocked product sensing system of claim 1, further comprising a plurality of conducting sub-plates positioned in a spaced relationship along a shelf of the product display, wherein each of the plurality of conducting sub-plates is individually selectable for measuring capacitance with respect thereto.

7. The stocked product sensing system of claim 1, further comprising an insulation layer between two adjacent conducting plates.

8. The stocked product sensing system of claim 1, wherein the processor comprises a computer-readable media having instructions stored thereon, the instructions when loaded onto a computer, cause the computer to identify product items positioned on the product display based on the capacitance received from the measuring circuit and preprogrammed product properties.

9. The stocked product sensing system of claim 1, wherein the processor comprises a computer-readable media having instructions stored thereon, the instructions when loaded onto a computer, cause the computer to identify an amount and configuration of product items displayed on the display based on historical changes in capacitance.

10. The stocked product sensing system of claim 1, wherein the predetermined capacitance value comprises a measured capacitance value of at least one of an empty product space or a full product space.

11. A method of determining a level of product availability on a product display including a plurality of conducting plates associated therewith, the method comprising the steps of:
    providing a first conducting plate as or on a shelf of the product display and a second conducting plate positioned relative to the first conducting plate to form a product space between the first conducing plate and the second conducting plate;
    supplying a first electrical signal to a first conducting plate;
    supplying a second electrical signal to a second conducting plate;
    measuring a capacitance of the product space containing one or more products placed on the first connecting plate and between the first conducting plate and the second conducting plate, wherein the measured capacitance of the space is dependent upon the permittivity of the space; and
    determining a change in the level of product availability on the first conducing plate within the product space based on the permittivity of the product space by comparing the capacitance measured to a predetermined capacitance value for the product space, wherein the permittivity of the product space changes with a change in the level of product availability on the first conducing plate within the product space.

12. The method of claim 11, further comprising the steps of:
    monitoring changes in capacitance between the first conducting plate and the second conducting plate; and
    determining the level of product availability on the product display based on the changes in capacitance.

13. The method of claim 12, further comprising the steps of:
    communicating capacitance data points to a memory circuit; and
    storing capacitance data points in the memory circuit.

14. The method of claim 11, wherein the second conducting plate is grounded.

15. The method of claim 11, wherein a third conducting plate is positioned between the first conducting plate and the second conducting plate, further including the steps of:
    supplying a third electrical signal to the third conducting plate, wherein the third electrical signal is the same as the first electrical signal.

16. A method of determining a level of product availability on a product display including a plurality of conducting plates associated therewith, the method comprising the steps of:
    storing the product in product spaces, each of the product spaces formed between two conducting plates of the plurality of conducting plates, with a first of the two conducting plates forming a display shelf surface for receiving the product thereon;

supplying an electrical signal to one of the plurality of conducting plates;
grounding the remaining conducting plates of the plurality of conducting plates;
measuring a capacitance for the one of the plurality of conducting plates while the remaining conducting plates are grounded, wherein the measured capacitance is dependent upon the permittivity of the product space for the one of the plurality of conducting plates, and the permittivity of the product space changes with a change in the level of product availability within the product space;
repeating the supplying, grounding, and measuring steps for each of the product spaces; and
determining a level of product available with respect to each conducting plate of the plurality of conducting plates by solving a set of tri-diagonal linear equations including the measured capacitance for each of the product spaces.

17. The method of claim 16, further comprising the step of:
displaying capacitance in a human-readable and customizable format.

18. The method of claim 16, further comprising the step of:
generating an alert based on a user-selected criterion.

19. The method of claim 16, further comprising the step of:
storing capacitance data points in a memory circuit.

20. The method of claim 19, further comprising the step of:
determining product item configuration on the product display based on historical capacitance data points.

21. The method of claim 16, wherein the electrical signal is supplied at a plurality of frequencies, further comprising the step of:
identifying product items present on the product display based on capacitance at the plurality of frequencies.

* * * * *